Jan. 20. 1925.

L. G. NILSON 1,523,828

PACKING RING

Original Filed Oct. 2, 1915

WITNESSES:
Fred. Rieger
H. C. Schlicker.

INVENTOR
Lars Gustaf Nilson
BY
H. C. Karlson
ATTORNEY

Patented Jan. 20, 1925.

1,523,828

UNITED STATES PATENT OFFICE.

LARS GUSTAF NILSON, OF HOBOKEN, NEW JERSEY.

PACKING RING.

Application filed October 2, 1915, Serial No. 53,768. Renewed April 9, 1920. Serial No. 372,703.

*To all whom it may concern:*

Be it known that I, LARS GUSTAF NILSON, a citizen of the United States, and a resident of Hoboken, in the county of Hudson and State of New Jersey, have invented certain new and useful Improvements in Packing Rings, of which the following is a specification.

This invention relates particularly to packing rings made from metal, such as are used on or in connection with pistons, valves, piston or valve rods, and like mechanical devices.

One object of the invention is to produce a packing ring of the type aforesaid, that will form a perfectly tight joint at all points between the element carrying it and the surface with which the same is in sliding contact, including the place where the ring is usually parted.

A further object is the production of a packing ring that will at all times, and along its entire circumference, exert an even, yielding pressure upon the walls of the cylinder, barrel, or other part with which it coacts.

Another object is the provision of a packing ring of uniform cross-section, capable of being applied to a piston so as to leave the same space all around its own circumference and the bottom of the piston groove wherein it is lodged, and so that the ends of the ring will be maintained in alignment one with the other, irrespective of the expansion and contraction to which they are normally subjected.

Still another object is to provide a packing ring that is easily adjusted in position, and of such simple construction as to be amenable to rapid manufacturing methods, which will make it a low-cost appliance.

Other objects and advantages of the invention will become apparent as the specification proceeds.

With the aforesaid objects in view, the invention consists of the improved construction, arrangements and combinations of parts hereinafter described pointed out in the subjoined claims, and illustrated in their preferred embodiment by the accompanying drawings, wherein:—

Figure 1:
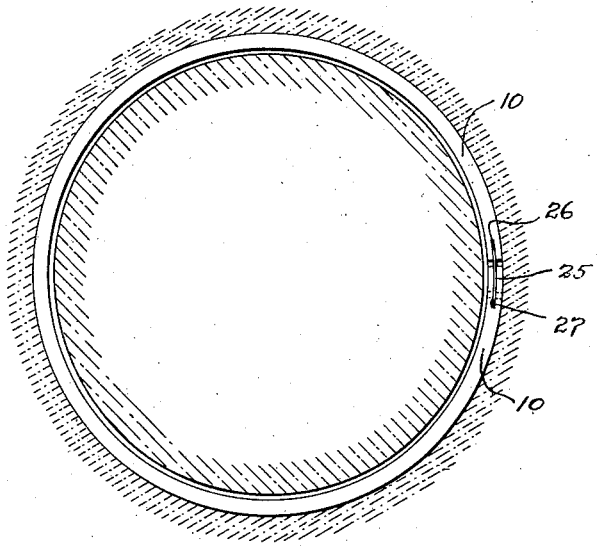
Figure 1 is a plan view of this improved packing ring applied to a piston, adjacent parts being shown in section.

Heretofore piston rings have been made in accordance with one or another of the following forms and conditions, namely;—

1st. Concentric rings cut in certain parts and sprung into a slightly smaller circular bore;

2nd. Eccentric rings, that is, split rings having a varied thickness along their circumference, which allows the parted ends to bend more than the body of the ring, so that they will fit a circular bore when sprung together;

3rd. Rings of either one of the two types just mentioned, furnished with loose pieces interposed between the ends of the rings or placed under the open gaps thereof;

4th. Multiple and double rings placed concentrically one within the other, and arranged to clasp each other so as to make or break joints, which are staggered;

5th. Rings formed with single or double lips, intended to lap over the joint or spline at the ends; and 6th. Rings hammered or compressed circumferentially in order to impart to them the required resilience.

Experience has shown that a ring of the first form above referred to bears only at the ends and in the middle.

A ring of variable thickness, or eccentric, as stated with reference to the 2nd form, exerts an unequal pressure that results in uneven, detrimental wear of the cylinder walls, and besides, a pocket is formed inside the thinner portion of the ring, which, in the case of internal combustion engines particularly, soon fills up with soot that injuriously affects the resilience of the ring.

According to the 3rd form, the loose or extra piece added to the ring is supposed to fill up the interstices between the ends thereof, but in practice the ring does not exert the same pressure at that point as it does at other places around its circumference, on account of which the loose piece fails to wear at an equal rate with the ring and the cylinder, and furthermore there is the danger of the loose piece becoming dislocated, in which event the charge in the cylinder will partly escape at one side.

The double ring of the 4th form, cited has proved to be unreliable, on account of the lubricant that enters between the annular laminæ becoming carbonized by the heat which bakes them together, so to say, in one solid mass and renders the parts inoperative.

The species of ring alluded to as the 5th form is difficult and expensive to produce, in a manufacturing sense, and frequently it becomes inelastic at the joint.

While the ring appertaining to the 6th form has given fairly good results, the manufacture thereof involves an indirect method of producing the same.

A metallic packing ring especially suited for the cylinders and pistons of internal combustion engines and obviating the deficiences hereinbefore outlined, is realized by following the design and method of procedure embodied in the present invention.

Generally described, the invention comprises a ring formed by preference from an annular shell or blank of even thickness throughout, the sides whereof are machined in such a way that after a piece of the metal has been cut out of the severed ring to produce a gap between the ends thereof, these sides, when subjected to a uniform strain or load stress, will curve sufficiently for the ring to fit at once the cylinder into which it is sprung, with the same pressure all around. Further the invention includes a slip or feather flexibly joining the aligned ends of the ring, and also preventing leakage at their juncture.

Figure 4:
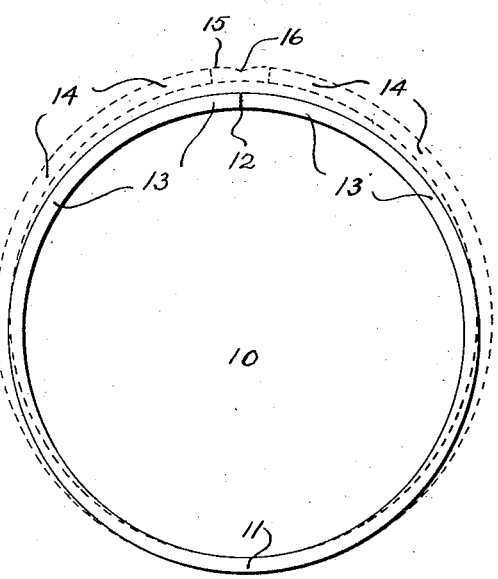
Figure 4 is a plan view of the ring alone, the original configuration thereof, before fitting, being indicated by dotted lines.
Figure 5:
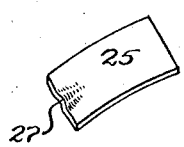
Figure 5 is an enlarged perspective view of an adjunct to the ring.

It is a known fact that a beam of uniform cross-section throughout, and held horizontally by one end only, will, if evenly loaded in the direction of its length, deflect according to a parabolic curve, also, it is true, that a beam of this designation, when given an initial set conforming to a parabolic curve, will, if loaded in a similar manner, deflect to a straight line. Applying this principle to the present invention, and referring particularly to Fig. 4 of the drawing, it will be noted that if a split ring or annulus, as 10, of even cross section, is uniformly loaded internally in both directions from a point 11, opposite the split or cut 12, the sides and ends 13 of the ring will spread apart and out on curves, as indicated by the dotted lines 14. The curved sides and ends bear the same relation to the original annulus as a parabolic curve does to the straight line, in the manner before described with reference to a beam in loaded and unloaded conditions. Similarly if a strip, formed initially curved along the dotted lines 14, 14, is loaded evenly, it will inversely revert to the condition represented by the full lines 13. To accomplish these results, in pursuance of the invention, an annulus of the size indicated by the dotted lines 14 is machined in such a way that after cutting off a short piece as 15 therefrom and subjecting the parted sides to a load strain, to wit, by pressing them evenly all around, these sides will take the curvature denoted by the full lines 13, 13. The machining is preferably performed by imparting either to the tool or to the work a slight reciprocatory or swinging motion, which will produce the correct swelled-out effect indicated at 14, 14, on each side of the cutting point 12. The location of the latter is predetermined by the same tool, by feeding it in abruptly at the chosen point, to produce a depression as at 16.

The extent of the curvature which in the present specification and claims is called cyclic-parabolic, or any particular size of ring is figured out in advance according to a predetermined shape calculated on definite transferring distances from similarly located points in a loaded beam as above referred to. It is important to note in this connection that permanently good results can be obtained only by using materials having natural resilience or elasticity.

Figure 2:
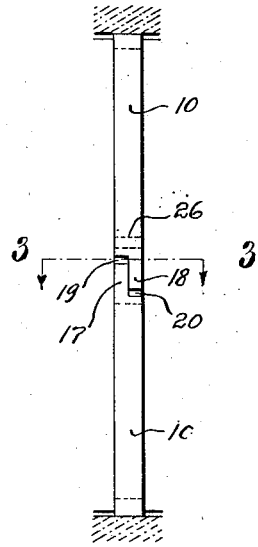
Figure 2 is an edge or side view of the ring represented in Fig. 1, adjacent parts being again shown in section.
Figure 3:
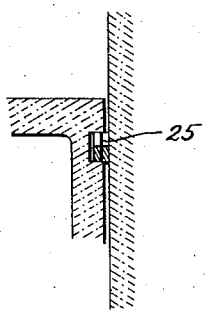
Figure 3 is a section on the line 3—3 of Fig. 2, looking in the direction of the arrows therein.

The ends of the finished ring are preferably formed with tongues, 17, 18, offset in opposite directions so as to lap one over the other. As shown in Figs. 1, 2 and 3, the tongue 17 takes up one-half the depth of the ring at one of its ends, and the tongue 18 occupies the remaining half of the ring's depth at the other end thereof. Terminal spaces 19, 20 are provided in the ring for the ends of the tongues 17, 18 respectively, to afford them freedom of motion when the ring is compressed.

An elastic slip or feather 25 is provided in order to block up the said spaces 19, 20, so as to prevent the charge in the cylinder from escaping through them, or between the contacting faces of the tongues 17, 18. This slip is confined mostly in grooves or kerfs, as 26, extending inwardly from both ends of the split ring, in a circumferential direction, and preferably concentric with the ring's axis. One end of the slip is also preferably anchored within its groove, while the other end thereof is left free to move in the opposite groove. In the present exemplification of the invention, the said slip 25 extends sidewise for the full depth of the ring, and is formed at one end with a slight corrugation 27, which upon being forced into the opposite groove binds against the walls thereof and prevents displacement of the slip. The latter not only shuts off communication between the cylinder and the clearance space back of the ring, which space incidentally may be very small owing to the ring's peculiar construction, but it also maintains the ends of the ring in alignment, without interfering with the normal pressure outward or inward at the point of juncture.

Although an outwardly-expanding one-piece packing ring has been shown and described, it is understood that the invention contemplates as well a ring composed of plural parts, and also an inwardly-clasping ring, embodying the features herein recited.

Having described my invention, what I desire to secure by Letters Patent and claim is:—

1. A packing ring consisting of a parted annulus provided with terminal slits, and a bridging element fitted therewithin, said element having an uneven surface adapted to engage one of said slits and be bound therein by lateral compression.

2. A packing ring consisting of a parted annulus formed with slits in its opposite ends, and a bridging element therefor having a corrugation whereby it can releasably engage one of said slits.

3. A split packing ring having a circular contour when compressed to working size, and having when free the form of a non-circular ring whose curvature constitutes a cyclic-parabola.

4. A split packing ring for a circular bore, which packing ring when free is larger than when compressed to working size, and has an outer curvature defined by the outer terminals of radii vectors taken from a common center and progressively increasing in length as they approach the free ends of the ring, the initial radius vector being drawn normal to the outer curve of the ring and being equal in length to the radius of the circular bore for which said ring is intended.

5. A split packing ring for a circular bore, which packing ring when free has the form of a curve constituting a cyclic parabola and bearing the same relation to the circle of the bore when the ring is compressed as the parabola of a beam loaded at one end bears to the unloaded beam.

6. A split packing ring for a circular bore, said packing ring being of uniform cross-section through-out and having when free the form of a curve external of its contour when compressed, the curve of said ring when free constituting a cyclic parabola and bearing the same relation to the circle of the bore as the parabola of a beam loaded at one end bears to the unloaded beam.

7. A resilient split packing ring for a circular bore having when free the form of a curve external of its curvature when compressed, said curvature of the ring when free constituting a cyclic parabola and bearing the same relation to the curvature of said ring when compressed to the bore as the parabola of a beam loaded at one end bears to the unloaded beam.

8. A split packing ring of resilient material and uniform cross section, having when unflexed, the form of a normally circular split ring of the same material and cross section expanded by uniform internal pressure.

9. A split packing ring of resilient material and uniform cross section, having when unflexed, the form of a normally circular split ring of the same material and cross section expanded by uniform internal pressure equal per unit area to the desired pressure of the packing ring against the cylinder bore.

10. A split packing ring of resilient material and uniform cross section, having, when unflexed, an external contour in the form of a curve externally tangent to a circle, the tangent point being opposite the split portion, and the radial distance from any given point on said circle to said curve on either side of said tangent point being equal to the deflection of a corresponding point of a centrally supported uniformly loaded horizontal beam of uniform cross section, the ends being sufficiently separated to permit the ring being flexed into the contour of the tangent circle.

11. A split packing ring of uniform cross section, having, when unflexed, an external contour in the form of a curve externally tangent to a circle, the tangent point being opposite the split portion, and the radial distance from said circle to said curve on either side of said tangent point increasing directly as the square of the arc included between said tangent point and the measuring radius, the material of said ring being sufficiently resilient and the ends being sufficiently separated to permit said ring to be flexed to the form of said tangent circle.

12. A packing ring consisting of a parted annulus provided with terminal slits, and a bridging element of substantially the same width as the annulus fitted within said slits, said element being yieldably and releasably anchored in one of said slits and free to slide in the other.

13. A blank for a packing ring having the form of a normally circular split ring of resilient material and uniform cross section expanded by uniform internal pressure, said blank being continuous across the portion corresponding to the gap between the parted ends of the split ring.

14. A blank for a packing ring, the outer curvature of said blank being defined by the outer terminals of radii vectors taken from a common center and progressively increasing in length from an initial radius vector drawn normal to said curve, to the radius vector 180° removed therefrom.

Signed at the borough of Manhattan, in the county of New York and State of New York, this 1st day of October, A. D. 1915.

LARS GUSTAF NILSON.

Witnesses:
H. C. KARLSON,
W. H. GEE.